(12) United States Patent
Williams

(10) Patent No.: US 6,592,448 B1
(45) Date of Patent: Jul. 15, 2003

(54) COMPUTERS WITH POWER EXHAUST SYSTEMS

(75) Inventor: John Williamson Williams, Chapel Hill, NC (US)

(73) Assignee: contrapposto, inc., Durham, NC (US)

( * ) Notice: Subject to any disclaimer, the term of this patent is extended or adjusted under 35 U.S.C. 154(b) by 0 days.

(21) Appl. No.: 09/519,270

(22) Filed: Mar. 7, 2000

(51) Int. Cl.$^7$ ................................................. H05K 7/20
(52) U.S. Cl. ....................................... 454/184; 361/695
(58) Field of Search ........................... 454/184; 361/695

(56) References Cited

U.S. PATENT DOCUMENTS

| | | | |
|---|---|---|---|
| 2,735,964 A | 2/1956 | Grieve et al. | 317/101 |
| 2,912,624 A | 11/1959 | Wagner | 317/100 |
| 3,016,813 A | 1/1962 | Frasier et al. | 98/1 |
| 3,654,417 A * | 4/1972 | Javes et al. | 219/10.55 |
| 5,193,523 A * | 3/1993 | Denber | 126/204 |
| 5,400,217 A | 3/1995 | Whitson et al. | 361/695 |
| 5,497,825 A | 3/1996 | Yu | 165/11.1 |
| 5,559,673 A | 9/1996 | Gagnon et al. | 361/695 |
| 5,706,170 A | 1/1998 | Glovatsky et al. | 361/695 |
| 5,725,622 A | 3/1998 | Whitson et al. | 55/385.4 |
| 5,730,770 A * | 3/1998 | Greisz | 55/385.6 |
| 5,751,550 A * | 5/1998 | Korinsky | 361/695 |
| 5,876,278 A * | 3/1999 | Cheng | 454/184 |
| 5,917,697 A | 6/1999 | Wang | 361/695 |
| 5,917,698 A | 6/1999 | Viallet | 361/695 |
| 6,174,231 B1 * | 1/2001 | Bodin | 454/184 |

FOREIGN PATENT DOCUMENTS

DE  4111333 A1 * 10/1992

OTHER PUBLICATIONS

Products Illustrated at Web Site http://www.computersdivine.com/main.htm, Copyright 2000/ Computers Divine Inc. (Jan. 5, 2000).

* cited by examiner

Primary Examiner—Jiping Lu
(74) Attorney, Agent, or Firm—Myers Bigel Sibley & Sajovec PA

(57) ABSTRACT

Computers with power exhaust systems include a visually dominant top or side mounted power exhaust stack in fluid communication with an exhaust fan mounted proximate to the top or side mounted stack. The power exhaust fan pulls ambient air in from the lower portion of the computer and forces it out the top or a top portion of the housing into a power exhaust stack. The power exhaust stack is prominently positioned on the computer to provide a visual focal point reminiscent of an automotive "souped-up" operating machine which can forcibly cool the computer even when loaded with high-end graphics cards and fast microprocessors. The power exhaust stacks can be configured in a number of ways such as in an arcuate or linearly extending diesel truck-like chrome stack configuration, or in a header or laterally extending exhaust pipe(s) configuration.

37 Claims, 14 Drawing Sheets

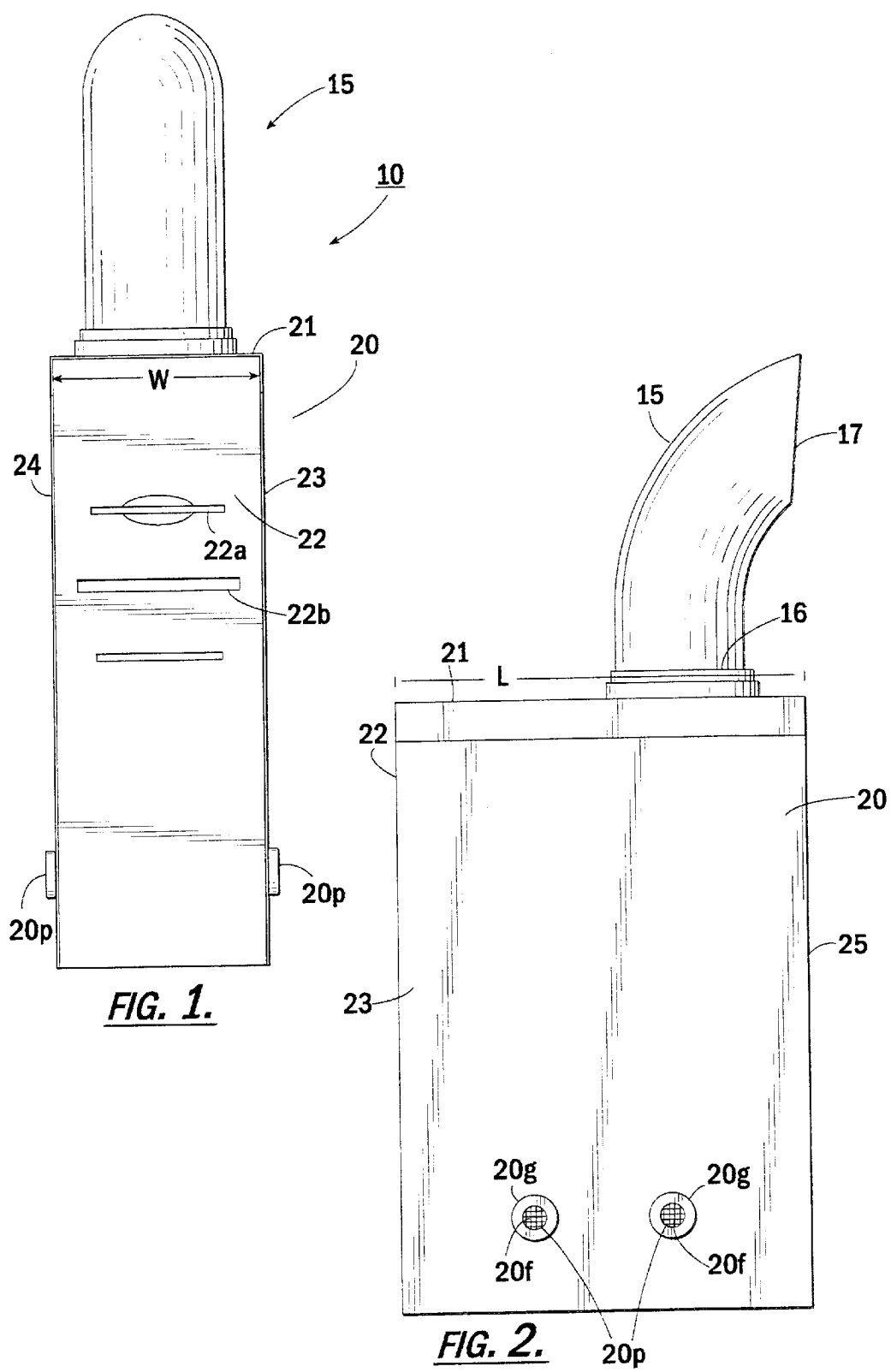

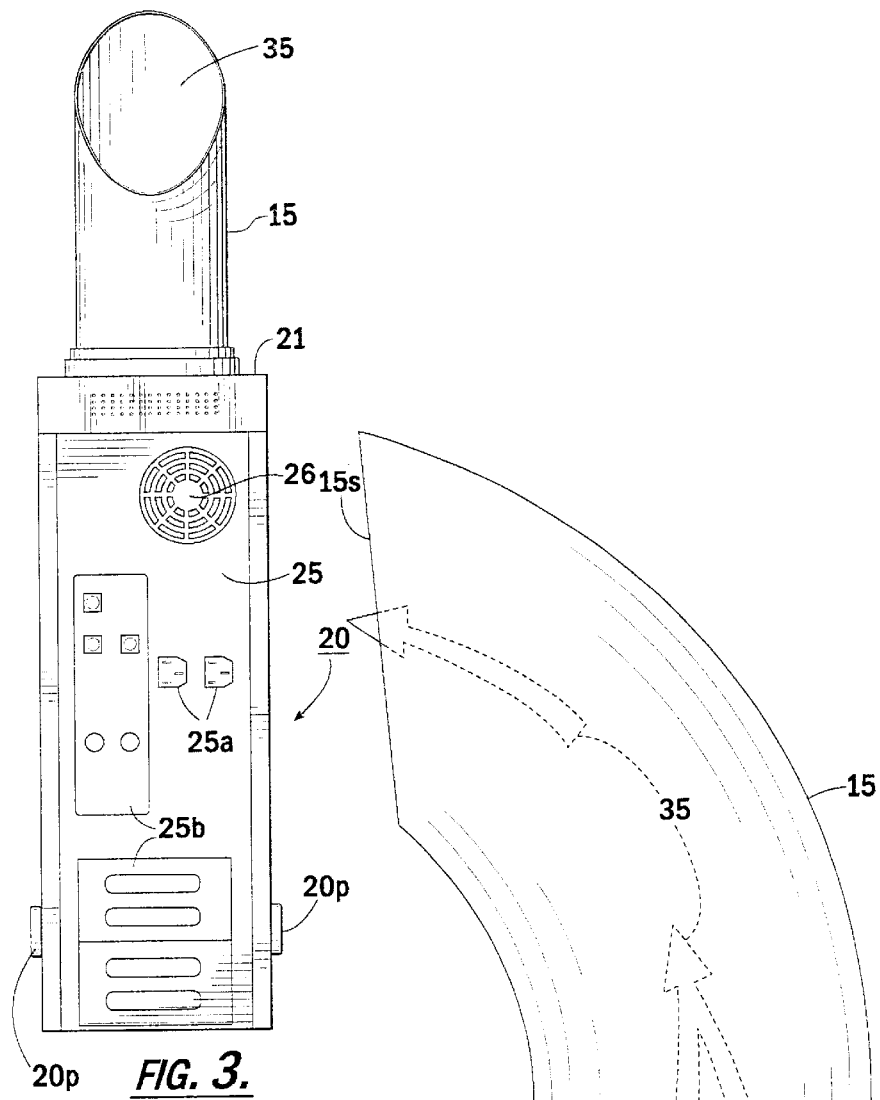
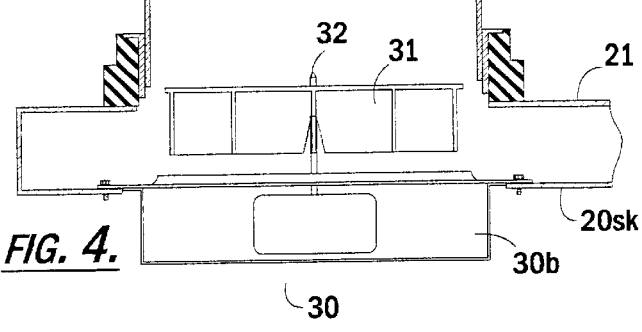
FIG. 3.
FIG. 4.

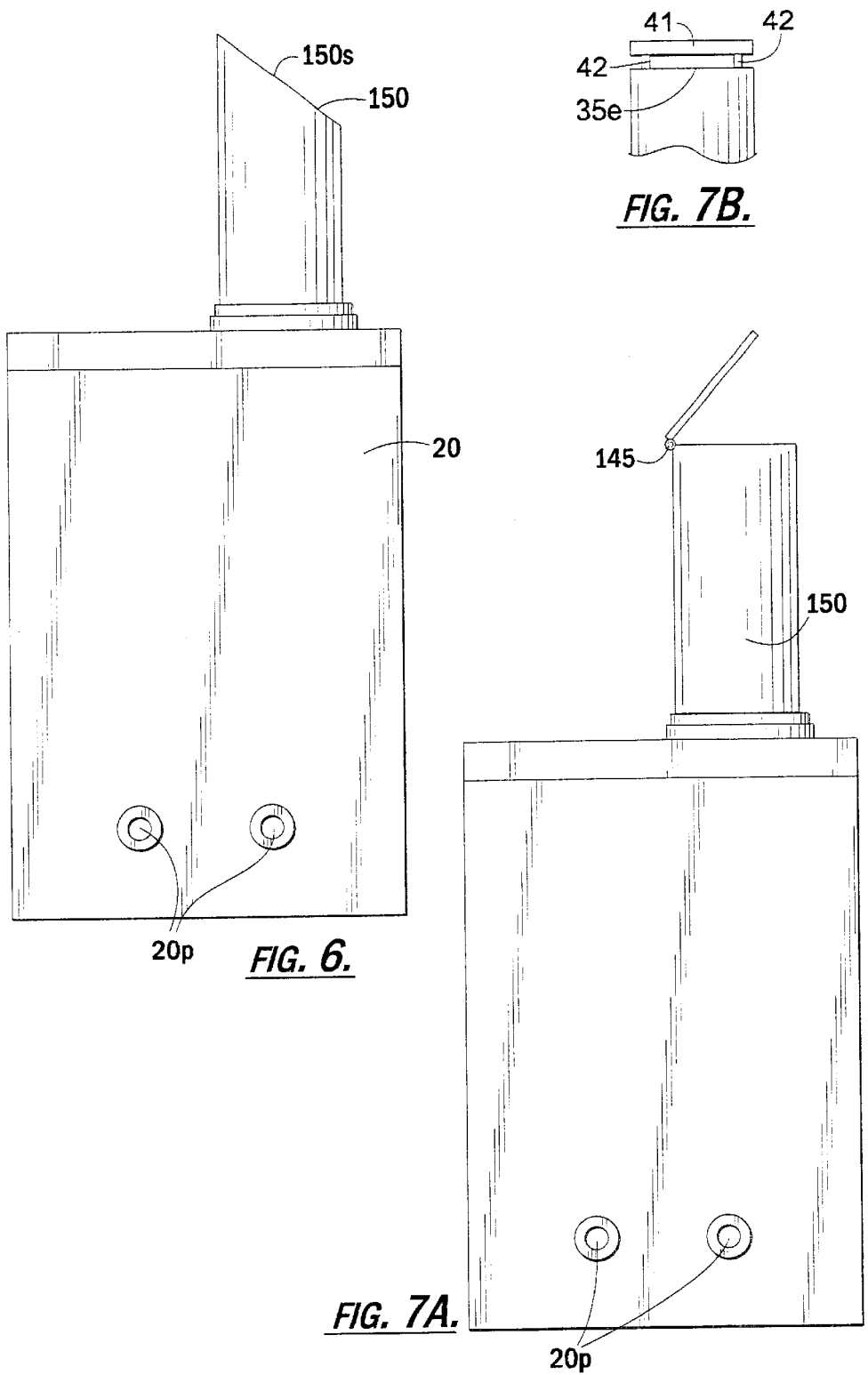

COMPUTERS WITH POWER EXHAUST SYSTEMS

FIELD OF THE INVENTION

The invention relates to exhaust systems for computers, and particularly to exhaust systems for personal computers.

BACKGROUND OF THE INVENTION

Conventionally, computers have used exhaust fans to exhaust hot air from the computer casing to cool electronic equipment held therein. Typically, as shown in U.S. Pat. No. 5,559,673 to Gagnon et al., one or more exhaust fans are positioned on the rear of the computer housing or casing and hidden from main viewing surfaces.

Many computer gaming enthusiasts are searching for improved ways to cool their computer systems to obtain improved performance and/or graphic capability compared to conventional systems. Improved cooling can be particularly helpful for computer systems employing increased numbers of heat generating components such as faster operating microprocessor chips, more electronic powered devices, and/or multiple graphics cards. The increased graphic capability is desirable for many gaming enthusiasts in order to provide more realistic play, and/or improved PC gaming platform performance.

In operation, computer systems with advanced operating protocols and components and improved cooling can improve the response time or speed of the system. Unfortunately, by employing a larger number of powered electronic equipment within the computer casing and/or by configuring the computer system with faster operating systems, the computer system within the housing can build up heat during operation and potentially, and undesirably, overheat, thereby causing the system to crash.

In addition, such exhaust systems are conventionally hidden from view (positioned on a rear surface of the housing) or otherwise de-emphasized so as to blend in with the computer housing.

SUMMARY OF THE INVENTION

It is, therefore, an object of the present invention to configure computers with power exhaust systems to vent heat therefrom to reduce the likelihood that the computer system performance will be negatively affected by overheating during operation.

It is another object of the present invention to emphasize visually the performance or power capability of the computer by configuring a power exhaust system in a visually dominant manner which is visible during use.

These and other objects of the invention are provided by a top-mounted (or side mounted adjacent the top) visually dominant power exhaust stack. Preferably, the power exhaust stack is in fluid communication with an exhaust fan to vent hot air from the top of the computer.

A first aspect of the invention is a computer with a power exhaust stack. The computer includes a computer housing with at least one upstanding wall (and typically four upstanding walls) and a ceiling attached to and overlying the at least one upstanding wall to define an enclosure. The computer also includes at least one power exhaust stack extending upwardly from the housing ceiling. The power exhaust stack comprises a tubular section with an airflow channel therein and opposing first and second end portions. The power exhaust stack tubular section has a profile when viewed from the side which rises a distance up from the ceiling and arcuately turns to direct the air flow channel (and second end portion) toward the rear of the computer. The computer includes a plurality of air vents disposed in at least one of the at least one upstanding walls and an exhaust fan mounted proximate to said ceiling in fluid communication with the power exhaust stack first end portion. During operation of a computer subsiding within the computer housing, the exhaust fan directs air out from the computer housing (i.e., above and away from the enclosure) through the power exhaust stack.

In a preferred embodiment, the power exhaust stack has a reflective external surface, or is formed of or coated with chrome or a chrome-like material, to provide an external surface which has the appearance of chrome, while the computer housing is red.

The invention can, alternatively, be directed to an aesthetic configuration to provide a computer housing with a visually dominant top-mounted exhaust stack (but not requiring the use of an upwardly mounted proximate exhaust fan). The computer housing includes a computer housing with at least one upstanding wall (and typically four upstanding walls) and a ceiling overlying the at least one upstanding wall to define an enclosure. The housing also includes at least one power exhaust stack extending upwardly from the housing ceiling. The power exhaust stack comprises a tubular section with at least one airflow channel therein and opposing first and second end portions. The power exhaust stack tubular section has a profile when viewed from the side which generally vertically rises a distance up from the ceiling and then arcuately turns to direct the air flow channel toward the rear of the computer housing.

A second aspect of the invention is a power exhaust modification kit for a computer. The power exhaust modification kit for a computer comprises an upwardly extending power exhaust stack with a tubular section comprising at least one air flow channel and opposing first and second end portions. The power exhaust stack tubular section has a profile when viewed from the side such that it generally vertically rises a distance up at the first end portion and then arcuately turns to direct the air flow channel toward the rear of the computer casing at the second end portion. The kit also includes a template configured to overlay at least a portion of the top of the computer casing. The template has visual indicia representing an opening sized and configured to correspond with the power exhaust stack first end portion for allowing a user to identify a desired location (and/or the desired size opening or shape of the opening) for an opening in the top of the computer. The kit also includes an exhaust fan sized and configured to assemble to the computer such that it is mounted proximate to the top of the computer adjacent the desired location. In position, the exhaust fan is operably associated with the power exhaust stack to direct air from the computer casing during operation.

In a preferred embodiment, the kit can include a second template configured to overlay at least one side of the computer, the second template has visual indicia representing at least one air vent aperture corresponding to air vent inlet openings for allowing a user to identify a desired location (and/or draw a desired opening shape) on the bottom portion of the side walls of the computer for the air vent aperture(s). The kit can also include grommets and filters to be positioned proximate to the air vent inlets.

Another aspect of the present invention is a computer housing with an alternate embodiment of a power exhaust stack. Similar to those described above, the computer housing includes at least one, and typically, four, upstanding side walls and a ceiling overlying the at least one (and typically, four) upstanding side walls. The computer also includes at least one power exhaust stack having a tubular section extending upwardly from the housing ceiling. The power exhaust stack tubular section comprises at least one airflow channel therein and opposing first and second end portions. The power exhaust stack tubular section has a profile which generally vertically rises a distance up from the ceiling and directs the airflow channel upwardly out (above and away) from the computer. The computer housing also includes at least one air vent disposed in at least one of the (four) upstanding walls and an exhaust fan mounted proximate to the ceiling in fluid communication with the power exhaust stack first end portion. During operation, the exhaust fan directs air out (above and away) from the computer housing through the power exhaust stack.

The second end portion of the tubular member can be either substantially horizontal or inclined. The computer housing can also include a lid pivotably connected to the end of the power exhaust stack second portion. The lid can be biased to open with relatively low air pressure exhausting from the computer. The lid can be a light weight component extending over the air flow channel. Alternatively, a stationary cap can be used such that it is fixedly attached to the second end portion of the stack but spatially separated a distance therefrom to provide an exit flow path therebetween.

Another aspect of the present invention is a computer housing with another embodiment of a top mounted exhaust stack. As above, the computer housing has at least one and typically four upstanding walls and a ceiling overlying the four upstanding walls to define an enclosure. The four upstanding walls include a front wall, a rear wall, and first and second opposing side walls. The computer housing includes an exhaust stack with an air foil section which extends upwardly from the housing ceiling. The exhaust stack airfoil section comprises at least one airflow channel and opposing first and second end portions. The first end portion is configured to overlie the ceiling adjacent the front wall. The power exhaust stack airfoil section has a profile which rises at the first end portion and then generally horizontally extends toward the rear wall to direct the airflow channel upwardly out and away from the computer housing and outward to exit in a direction which extends toward the rear of the computer housing. The computer housing also includes at least one air vent (preferably a plurality) disposed in at least one of the four upstanding walls and at least one exhaust fan (preferably a plurality) mounted proximate to the ceiling in fluid communication with the exhaust stack. During operation, the exhaust fan directs air out from the computer housing through the ceiling and into the exhaust stack so that air vents away and above from the housing.

Yet another aspect of the invention is directed to another embodiment of a power exhaust stack. In this embodiment, the power exhaust stack is mounted to a upper forward side-portion of the computer casing. The power exhaust stack is configured to resemble intake or exhaust or header pipe configurations. More particularly, as above, the computer housing includes at least one, and typically, four, upstanding side walls and a ceiling overlying the at least one, and typically, four, upstanding side walls (to define an enclosure). For four side wall configurations, the walls include a front wall, a rear wall, and two opposing side walls. At least one power exhaust stack is mounted to an upper forward portion of at least one of the side walls and the power exhaust stack extends outwardly the respective housing side wall. The power exhaust stack comprises at least one tubular member with an external surface and at least one airflow channel therein. The at least one tubular member has opposing first and second end portions. The power exhaust stack tubular member has a profile when viewed from above which extends outwardly from a forward portion of the side wall on which it is mounted and turns to extend generally horizontally alongside the respective side wall to direct the air flow channel such that the air exits out from said computer housing at a rearward portion of the side wall toward the rear of the computer (above and away from the housing). The computer housing also includes at least one air vent disposed in at least one of the upstanding walls and an exhaust fan mounted proximate to the ceiling in fluid communication with the power exhaust stack tubular member first end portion. During operation, the exhaust fan directs air out from the computer housing through the airflow channel in the power exhaust stack. The power exhaust stack at least one tubular member can be one or a bundle of tubular members, having the same or different lengths.

Accordingly, the present invention can provide a visually distinctive top-mounted (or upper side mounted) exhaust stack (i.e., a power exhaust stack) in a number of configurations, preferably to provide one or more of an aesthetic visually dominant appearance and/or to provide a power exhaust system which forces air out of the top of a personal computer housing. The power exhaust system can operate as a supplemental exhaust system ("piggy-backing" onto existing or conventional rear mounted fans) or as the primary exhaust system. The power exhaust system can be provided by an OEM (original equipment manufacturer) or as an add-on or modification to the computer in an after market kit.

In operation, the power exhaust stack is preferably in fluid communication with a cooling fan inserted into the top of the housing. The fan and power exhaust stack (i.e., power exhaust system) can reduce the likelihood that the computer will overheat by circulating ambient air from the bottom portion of the computer housing upwardly to emit the heated air out the top of the computer casing. The power exhaust can operate with any number of exhaust fan sizes, but preferably operates with fans having an output of about 50–70 cubic feet per minute. For power exhaust systems employing multiple top mounted fans, then smaller sized units can be employed, such as about 20–40 cfm units. Preferably, the power exhaust system can maintain the temperature inside the housing at about 90 degrees Fahrenheit even with a computer configured as a "tower style" computer with a two-tier shelf which is substantially loaded. Preferably, in keeping with the automotive theme, the power exhaust stack is configured with a chrome or chrome-like external surface.

Aesthetically, in order to make this power exhaust PC system bear a distinctive visually dominant custom appearance (to visually emphasize the power of the device itself), the invention preferably configures the power exhaust as a diesel type tubular chrome exhaust stack with an upwardly-extending, slightly arcuate profile which is preferably configured to direct the air exhaust flow toward the rear of the computer housing (directing the heated exhaust air above and away from the housing). Of course, as noted above, other automotive themed configurations can also be employed. Further, the housing itself may be provided in a color selected to additionally emphasize the "power" associated with the power exhaust system (preferably the color is associated with "souped-up" automotive (hot rod) products, such as candy apple red).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a front view of a computer with a power exhaust stack according to the present invention.

FIG. 2 is a side view of the computer with a power exhaust stack shown in FIG. 1.

FIG. 3 is a rear view of the computer with a power exhaust stack shown in FIG. 1.

FIG. 4 is an enlarged partial cutaway view of the computer with a power exhaust stack shown in FIG. 1, illustrating an exhaust fan mounted to the top of the computer in fluid communication with the power exhaust stack.

FIG. 6 is a side view of an alternate embodiment of a computer with power exhaust stack according to the present invention.

FIG. 7A is a side view of the computer with a power exhaust stack similar to that shown in FIG. 6, with a different end-configuration and with a "rain" cap pivotably mounted thereto.

FIG. 7B is a partial view of the power exhaust stack shown in FIG. 7A having a stationary cap attached thereto.

DETAILED DESCRIPTION OF PREFERRED EMBODIMENTS

Figure 5A:
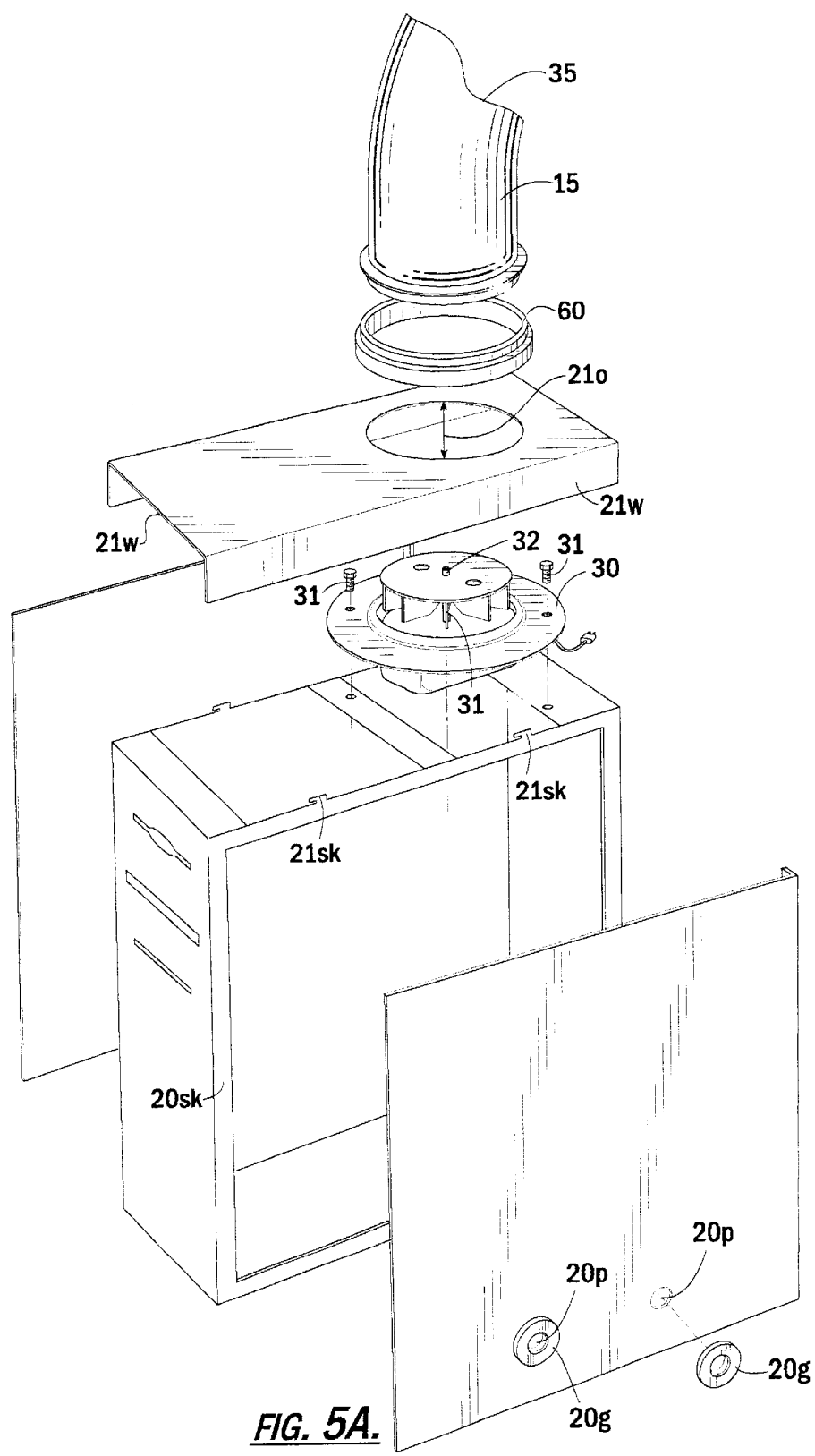
FIG. 5A is an exploded view of one embodiment of a computer with a power exhaust stack according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, certain regions or components may be exaggerated for clarity.

Generally described, the present invention is directed to power exhaust stacks for computers. The power exhaust stacks are configured to be visually dominant and visible during use of the computer to emphasize the power available in the operating system of the computer. Preferably, the power exhaust stacks are mountable to the top of computer casing or housing to direct the hot air out of the top of the computer housing (to a certain extent taking advantage of the fact that hot air rises). Alternatively, the power exhaust stacks can be mounted proximate the top of the housing, such as on upper portions of the side walls. In any event, the power exhaust stacks can be combined with one or more proximately-positioned exhaust fans to provide power exhaust systems for one or more of OEM (original equipment manufacturers) and after-market users.

Turning now to FIG. 1, one embodiment of a computer 10 having a power exhaust stack 15 mounted onto a computer housing 20 is shown. The computer housing 20 is preferably a "tower style" personal computer housing. As such, it includes at least one wall which, together with an overlying ceiling defines an enclosure space for holding the electronic components of the computer. This computer housing can be rectangular, triangulated, cylindrical, oval, or otherwise configured. As shown in FIGS. 1–3, the computer housing 20 is substantially rectangular and includes four upstanding walls 22, 23, 24, 25 and a ceiling 21 or top overlying the four walls. As shown, the four walls include a front wall 22, rear wall 25, and two opposing side walls 23, 24. The front wall 22 typically includes the CD and floppy/hard disc drives 22A, 22B located thereon. Of course, other drives, ports, or operating buttons can also be located as desired on this surface. As shown in FIG. 3, the rear wall 25 holds the power port 25A and other connector ports 25B. It can also include one or more exhaust fans 26 mounted thereon to assist in the ventilation or exhaust of the heat from the computer housing 20. The computer housing 20 can also include air intake fans positioned to help increase air circulation (not shown).

Figure 11A:
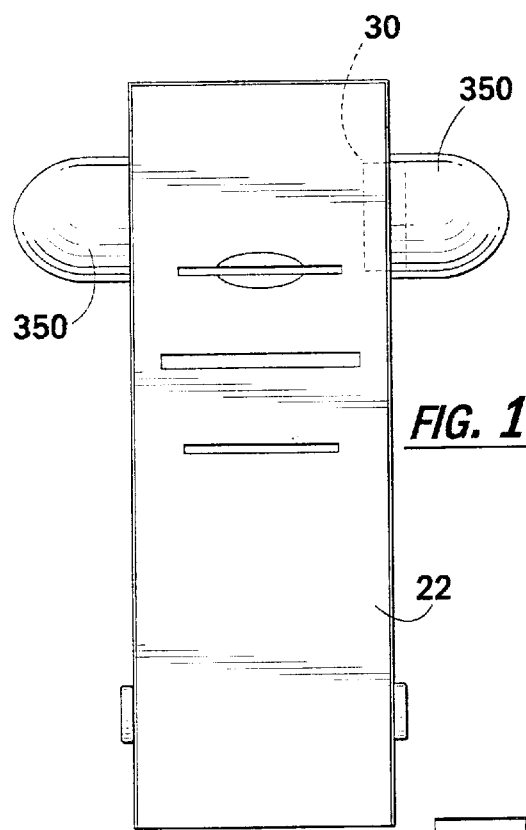
FIG. 11A is a front view of yet an additional embodiment of the present invention, illustrating a computer with an upper side-mounted power exhaust stack.
Figure 11B:
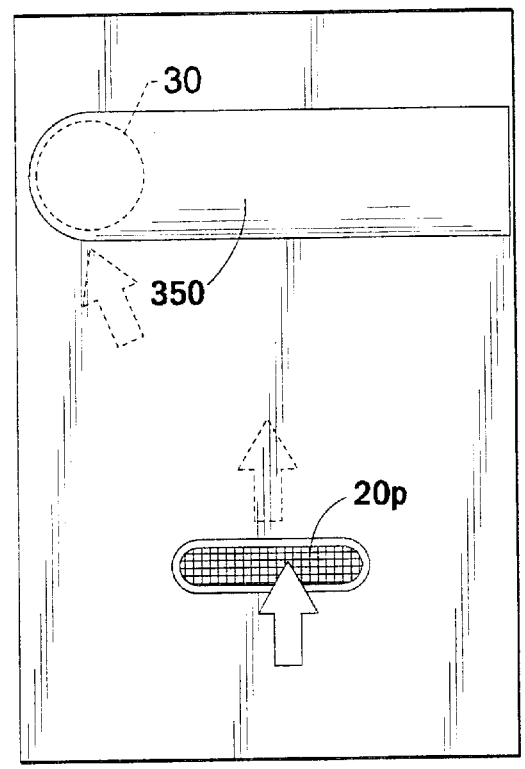
FIG. 11B is a side view of the computer and power exhaust stack shown in FIG. 11A.
Figure 11C:
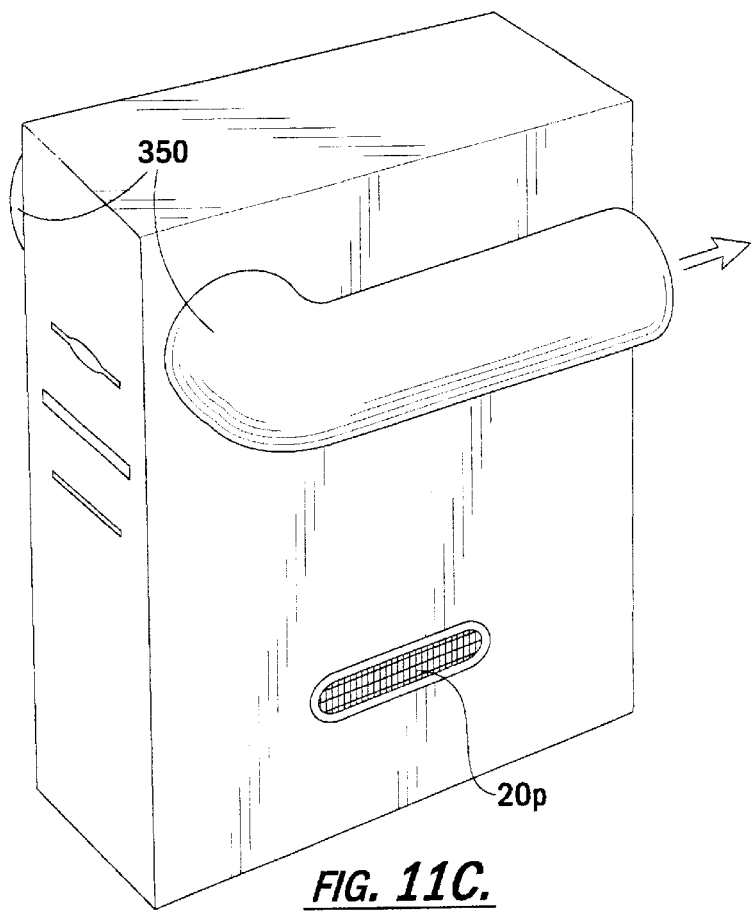
FIG. 11C is a perspective view of the computer and power exhaust stack shown in FIG. 11A.

Preferably, the computer housing 20 includes at one least air inlet port 20p therein (either with or without an associated intake fan). As shown, in FIG. 1, the computer housing 20 includes at least one air inlet port 20p formed in lower portions of opposing side walls 23, 24 of the computer housing. As is shown in FIG. 2, in a preferred embodiment, there are at least two corresponding air inlet ports 20p on each of the side walls 23, 24 (the opposing side wall 24 being configured substantially the same as the side wall 23 shown in FIG. 2). As shown, the four inlet ports 20p have about a 1.0 inch to a 1.5 inch diameter. Of course, other aperture configurations, shapes, and arrangements as well as numbers of air inlet ports (lesser or greater) can also be employed. For example, as shown in FIGS. 11B and 11C, a single elongated air inlet port 20p can be employed.

Filters 20f to filter or inhibit the intake of particulate matter and/or dust into the computer housing 20 can also be employed. The filters 20f can be positioned to overlay the opening in the inlet port such as via attachment to an inner surface of the side walls or the outer surface of the side walls 23, 24 proximate to the air inlet ports 20p. In a preferred embodiment, they are formed in an externally accessible grommet 20g to define a filter assembly 20a which can be easily inserted and removed from the exterior of the housing 20 to replace or clean the filter 20f at desired intervals. For unitary body grommets, the 20f is typically attached to an exterior surface prior to assembly to the housing to allow the grommet 20g to be popped into the air inlet port from the outside of the housing without obstruction or interference therefrom (the inside portion of the grommet yields as it slides into position over the port).

As shown in FIGS. 2 and 5A, the grommet 20g is configured and sized to securely reside on the circumference of the air inlet port 20p. The filter 20f can be configured as a fine metal mesh filter which is preferably configured to allow sufficient amounts of air to be drawn into the housing during operation while inhibiting the migration or introduction of dust, hair, or other particulate matter or larger sized foreign objects into the computer housing 20. It is preferred that the filter be configured as a micron rated filter to inhibit micron-sized matter from entering the computer.

Preferably, as shown in FIGS. 1 and 4, the power exhaust stack 15 is a tubular member which is mounted to the top or ceiling 21 of the computer housing 20. Although shown with a substantially circular or round cross-section, the power exhaust stack tubular member can be otherwise configured, such as with a rectangular, oval, square, or other external and/or internal shape(s) which provides an inner hollow portion which defines at least one air flow channel 35 therein. As such, the power exhaust stack 15 defines the air flow channel 35 which directs air out from the ceiling 21 (and above and away from ) the computer housing 20. As shown in FIG. 4, in this embodiment, the power exhaust stack 15 extends upwardly from the ceiling 21 and has a profile when viewed from the side which rises a distance up from the ceiling 21 and arcuately turns to direct the air flow channel 35 toward the rear of the computer housing 20.

As is also shown in FIG. 4, the computer 10 includes an exhaust fan 30 which is mounted such that it is proximate to the air flow channel 35. Preferably, as shown, the exhaust fan 30 is mounted onto the ceiling 21.

As shown in FIG. 5A, for computer housings 20 which have an underlying skeleton cage 20sk to which the outer side walls 23, 24 and ceiling 21 are attached, the exhaust fan 30 can be mounted to the top of the skeleton cage 20sk such that, after assembly, it is proximate to an opening 21o formed in the ceiling 21 and positioned to be in fluid communication with the air flow channel 35 of the power exhaust stack 15. As shown in FIG. 5A (and available in certain conventional computer models), the skeleton cage 20sk includes upper mounting prongs 21k onto which the ceiling which has matable portions (shown in dotted line as elements 21m in FIGS. 5C–5D) formed on the inside of the downwardly extending inner sidewalls 21w slides into and locks to thereby secure the ceiling to skeleton cage 20sk.

FIG. 5A also shows that, in this embodiment, the exhaust fan 30 is configured to mount to the top of the skeleton cage 20sk such that it extends a distance upwardly and out of the ceiling 21 of the housing. A seal 60 surrounds the perimeter of the fan 30 and attaches the exhaust stack 15 to the computer housing in a substantially air-tight manner.

Figure 5B:
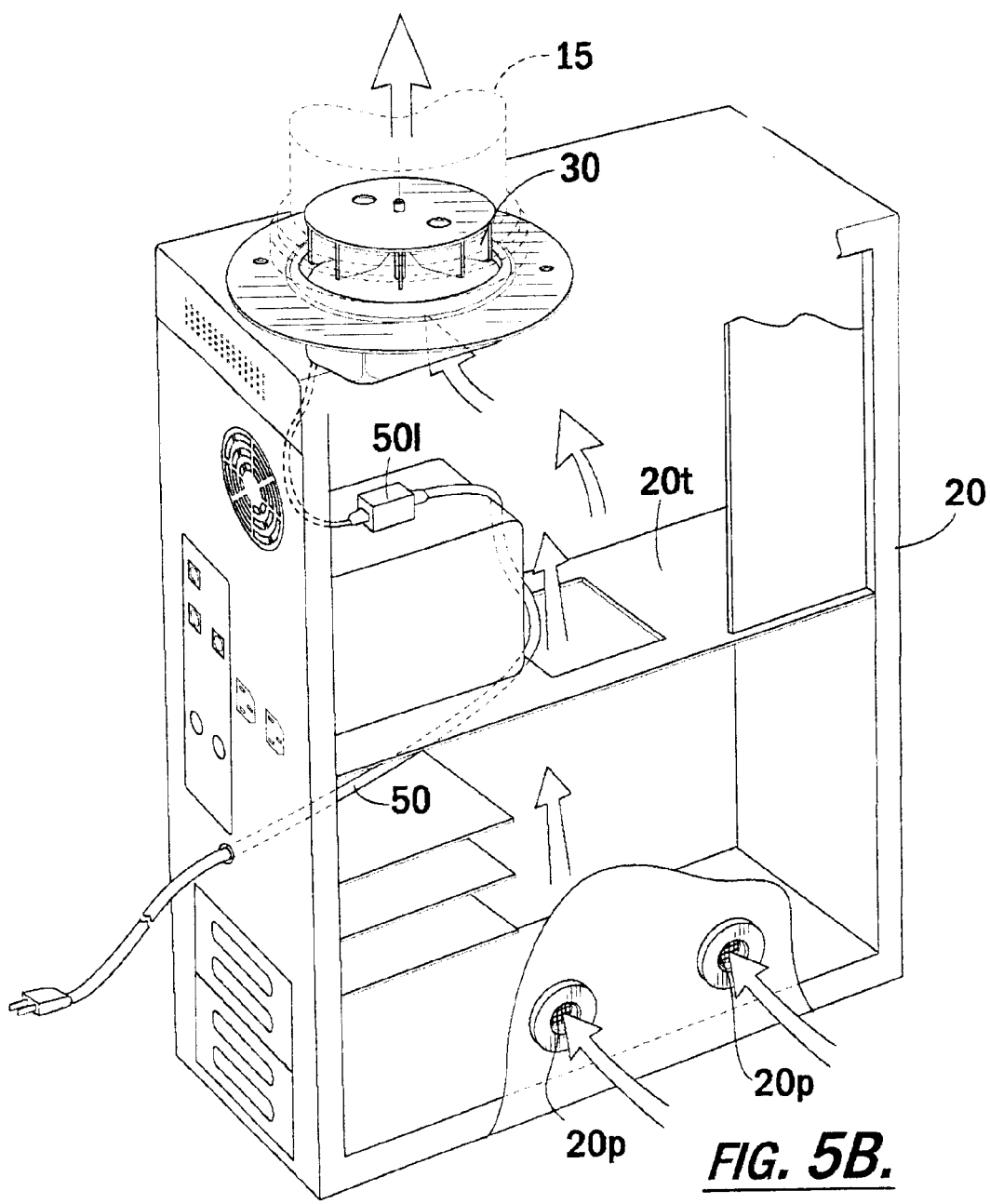
FIG. 5B is a side cutaway view of a computer housing illustrating air-flow in a two-tier tower style computer housing according to one embodiment of the present invention.
Figures 5C, 5D:
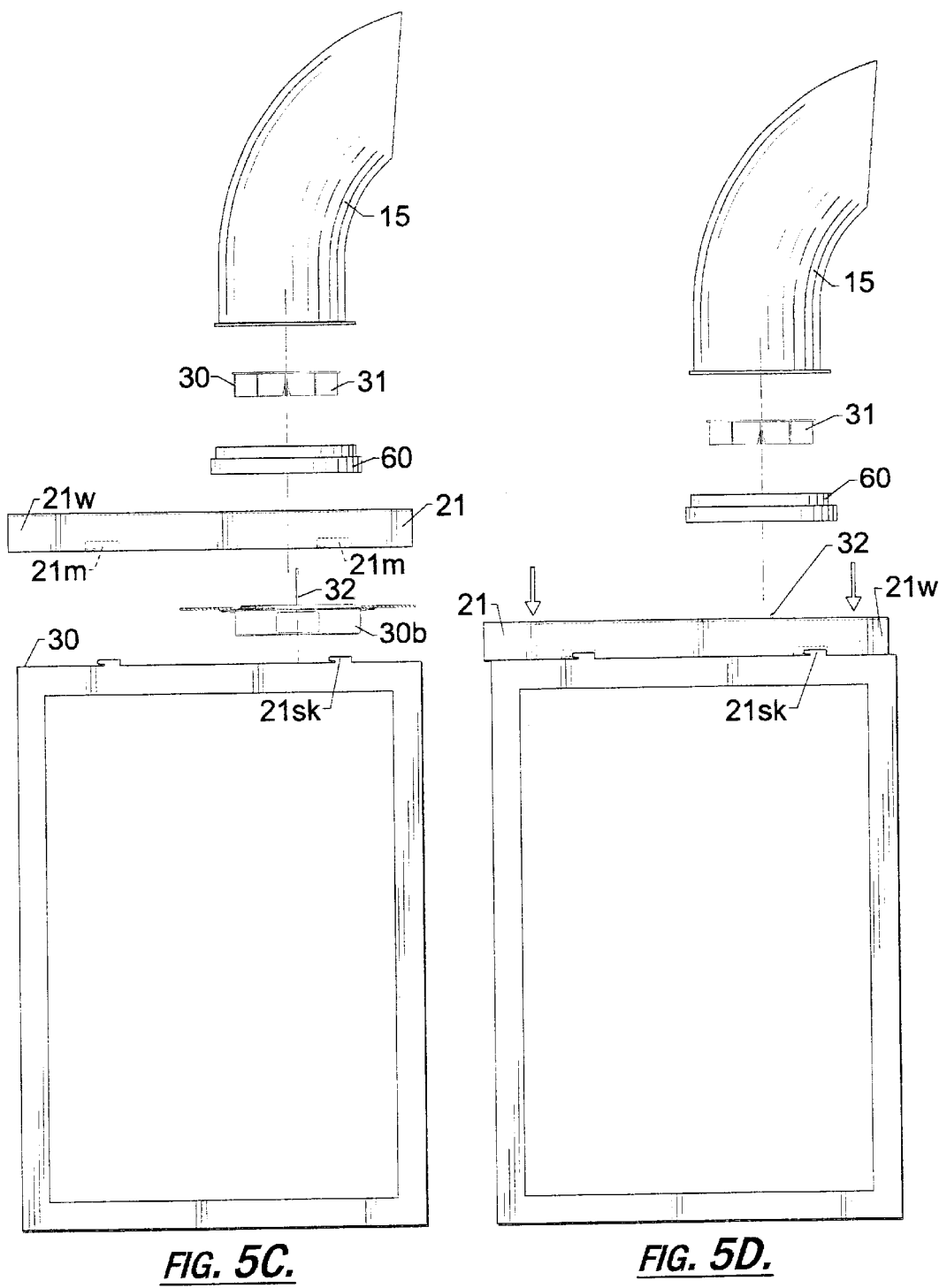
FIGS. 5C–5E are side views of assembly sequences for one embodiment of a top mounted power exhaust stack and exhaust fan (such as is shown assembled in FIGS. 1–3) according to the present invention.
Figure 5E:
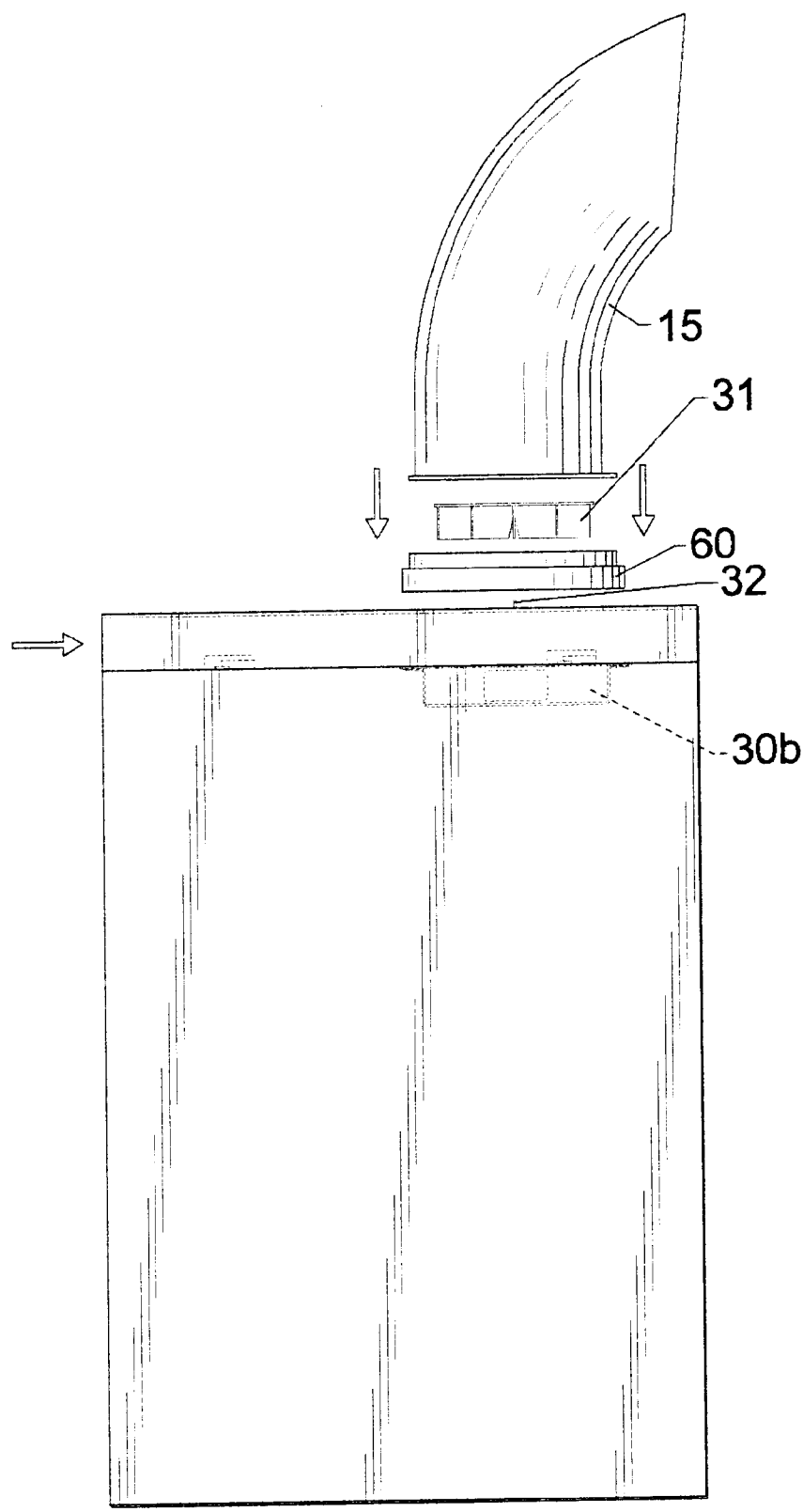

FIGS. 5C–5E illustrate an assembly sequence for the embodiment of the invention shown in FIG. 5A. As shown in FIG. 5C, the exhaust fan 30 is separated such that fan blades 31 (shown as a lightweight plastic integral blade assembly) are removed from the shaft 32 held on the fan body 30b. The fan body 30b is mounted to the top of the skeleton cage 20sk such that the fan shaft 32 is oriented upwardly and aligned with the opening in the ceiling 21o. The ceiling 21 is then pushed downward and then over to laterally slide such that inner sidewall mating portions 21m engage and mate with the mounting protrusions 21sk to lock into position. By removing the fan blades 31, the shaft 32 is narrow enough (even if it extends a distance above the ceiling) within the opening 21o to provide sufficient clearance to allow the ceiling 21 to be manipulated thereabout. If one were to leave the fan blade 32 mounted to the fan body in this embodiment, the upper portion of the fan would block the lateral movement within the closed perimeter of the circular opening needed to allow the sliding engagement with the skeleton cage. As shown in FIG. 5E, once the ceiling 21 is locked into position, the fan blades 32 can be reattached (either before or after the seal 60 is mounted to the ceiling) but preferably before the stack is mounted thereon. The seal is preferably adhesively secured to the top of the ceiling 21, thus, once secured to the housing remains in place. To gain entry to the housing subsequent to the assembly, one can remove the power exhaust stack 15, and pry the fan blades 32 of the shaft 31 to be able to slide the ceiling 21 off the mounting portions 21sk.

In any event, as shown in FIG. 4, the exhaust fan 30 is mounted proximate to the ceiling 21 such that it is in fluid communication with the first end portion 15f of the power exhaust stack 15. During operation, as shown in FIG. 5B, ambient air enters the air inlet ports 20p and travels up through the housing (through the second tier 20t in housings 20 having dual tiers, as shown). The air is then drawn up by action of the exhaust fan on top of the housing 20. The exhaust fan 30 then directs air out from the computer housing 20 through the power exhaust stack 15. Preferably, for single power exhaust fan configurations, the exhaust fan 30 is configured to operate at a rate of about 30–80 cubic feet of air per minute (cfm), and more preferably from about 50–70 cfm. In operation, the power exhaust stack 15 and exhaust fan 30 can generate an audible "whoosh", particularly at initial activation, as the air is forced up and out of the computer housing 20 which audibly affirms the power of the device.

As shown in FIG. 3, the power exhaust stack and exhaust fan are supplemental to a conventional air exhaust system 26, and can be run concurrent with operation of the computer, or can be intermittently, or selectively, operated, such as only when using problematic heat generating components like during the playing of action and/or graphic-intense games. A computer program icon representing the supplemental power exhaust system can be loaded onto the desktop such as found on a Windows® or Macintosh® based computer operating system for user selectable software controlled operation. Of course, heat sensors can be located within the housing at suitable locations to measure and represent the heat profile therein. For example, one or more sensors can be located proximate the graphics board(s), motherboard, or microprocessor in the housing. Accordingly, feedback to a controller indicating operating temperatures have exceeded recommended levels can act to automatically activate the power exhaust system. Alternatively, or additionally, a "software" trigger can be operably associated with pre-identified or computer programs coded and "tagged" as high energy software applications to activate the power exhaust system upon active selection of the tagged software program. Alternatively, the device can be manually activated and disabled as desired.

Turning again to preferred configurations, the instant invention can also employ one or more exhaust filters which can be located (preferably proximate the second end portion 15s of the power exhaust stack 15) in the power exhaust stack 15 so that it extends across the flow channel 35 (not shown). As the air exits the air flow channel 35, this filter is not concerned so much with the intake of dust, but rather the introduction of foreign objects such as toys, coins, or children's hands. As such, a larger mesh filter configuration can be employed. In addition, it is preferred that the exhaust filters be recessed a short distance from the second end portion 15s of the stack so as to not to interfere with the exterior appearance of the stack, while also reducing the distance a foreign object can readily enter into the exhaust stack.

Similarly, the computer 10 can also or alternatively include a cap or lid 40 hinged or pivotably mounted to an end portion of the power exhaust stack 15, such as shown in FIG. 7A. The cap 40 is preferably configured as a lightweight component to reduce the interference with the flow of air in the air flow channel. The hinge 45 is preferably biased to open upon application of a low magnitude pressure due to air exiting the computer housing through the air flow channel so as to not unduly restrict the flow of air therefrom. Of course, as shown in FIG. 7B, chimney-cap 41 stationary type arrangements can also be employed, these position the cap 41 a fixed distance away from the end of the stack via intermediate short stand-offs 42 and the air vents between the exit of the air flow channel 35e and the chimney cap 41. That is, the cap 41 is fixed spatially separated a distance from the second end portion of the power exhaust stack by mechanical attachment to spacers or standoff's 42 located around the perimeter thereof (this embodiment can be particularly suitable for linearly extending stack configurations). Of course, in either case, exhaust filters can also be used therewith (not shown).

As shown throughout, the power exhaust stack 15 is preferably configured to provide an aesthetic visually dominant appearance which provides a focal point for the computer housing 20 symbolic of the operating capability or power of the system itself. As shown in FIGS. 1 and 2, the ceiling has a length and a width; the length direction "L" extends between the front and rear walls 22, 25 of the computer housing 20 while the "W" width direction extends between the two opposing side walls 23, 24. As shown in this embodiment, the power exhaust stack 15 is preferably a single tubular shaped section which has a substantially round cross-section and a diameter sized at about at least 25–30% the length of the ceiling. As is also shown for this embodiment, the power exhaust stack 15 is mounted proximate the rear wall 25 of the computer. Preferably, the exhaust stack(s) are sized with an air flow channel 35 having a diameter of at least about 4 inches, and more preferably about 4.5 inches. As shown in the embodiment of FIG. 1, it is more preferred that the exhaust stack air flow channel 35 has a diameter which is substantially equal to the width of the ceiling 21.

In keeping with the above, it is also preferred that the power exhaust stack be configured with an externally reflective surface such as a metallic or chrome-like coating, plating, or deposition formed over a plastic or resin or fiber-reinforced resin substrate. Of course, the substrate should be selected to withstand temperatures associated with the exhausted air. It is more preferred that power exhaust stack be configured from chrome. The chrome or chrome-like appearance of the external surface yields an automotive themed hot rod "souped-up" aesthetic appearance. Similarly, the computer housing 20 can be provided in colors representing hot-rod colors (such as candy apple red, bright or canary yellow, metallic primary colors, or other similar "muscle" colors). Alternatively, or in addition, the computer housing can be ornamented with lightning bolts, flames, and other power-invoking or "muscle" images.

Figure 8:
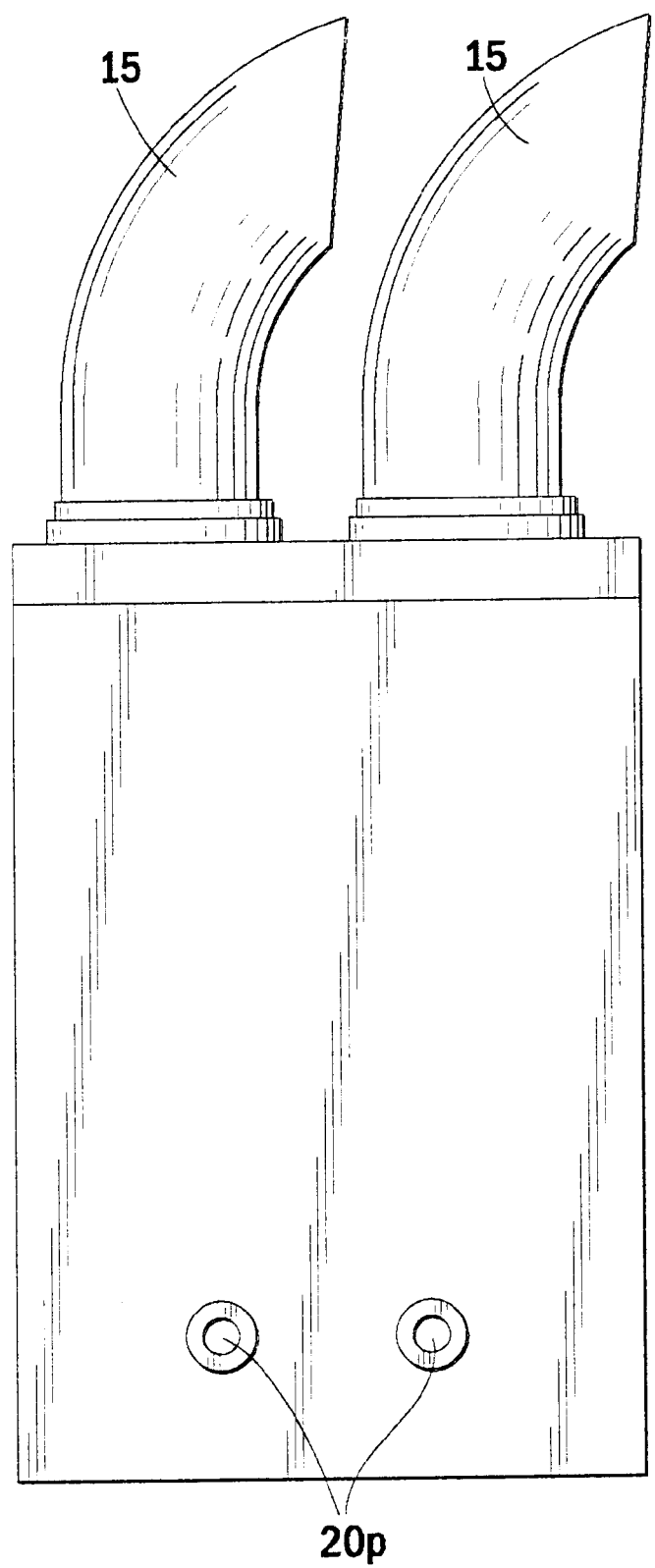
FIG. 8 is a side view of yet another embodiment of a computer with two-power exhaust stacks according to the present invention.

Other power exhaust stack configurations can also be employed. For example, as shown in FIG. 8, the power exhaust stack 15 can be configured as a plurality of aligned power exhaust stacks 15. FIGS. 6 and 7A illustrate yet another embodiment: a generally vertically-extending stack 150 (i.e., it extends upwardly from the housing ceiling 21 to direct the air upwardly out of the exhaust stack). FIG. 6 also shows an inclined top perimeter surface 150s. FIGS. 7A and 7B illustrate that the top perimeter surface can be substantially planar. As noted above (for any embodiment described herein although not required), but particularly for the power exhaust stack 150, an exhaust filter and/or cap 40, 41 can be attached thereto.

Figure 9A:
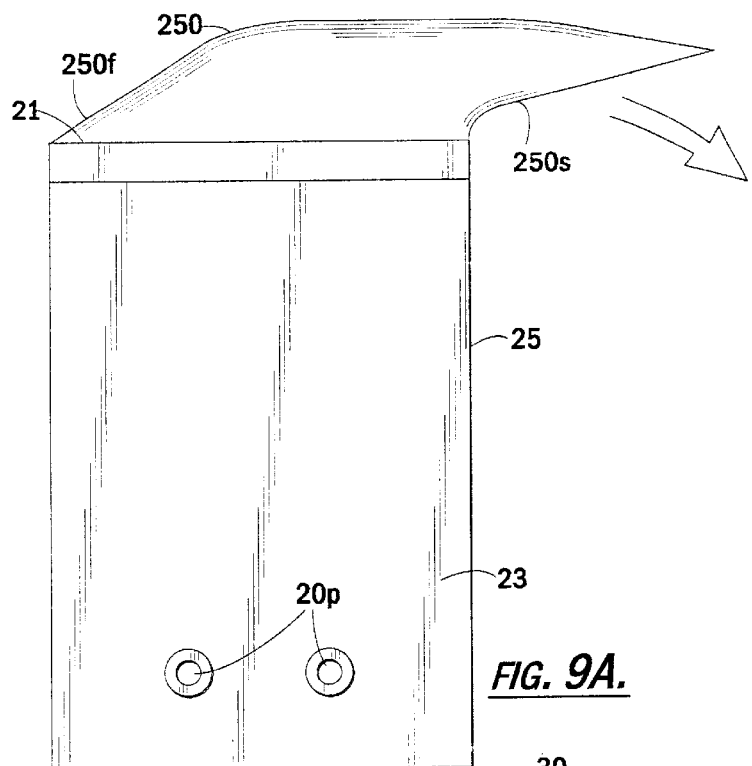
FIG. 9A is a side view of an additional embodiment of a computer with a power exhaust stack in an airfoil configuration according to the present invention.

FIG. 9A illustrates a power exhaust stack 250 representative of an air foil design. As shown, the exhaust stack 250 includes an air foil section which extends upwardly from the housing ceiling and includes at least one air flow channel 35 therein. The exhaust stack 250 includes opposing first and second end portions 250f, 250s. The first end portion 250f is configured to overlie the ceiling 21 adjacent the front wall 22 and preferably extends substantially coincident with the ceiling (covering substantially the entire width and at least a partial distance along the length of the ceiling 21). The power exhaust stack air foil section 250 has a profile which is curvilinear such that it rises at the first end portion 250f and then substantially horizontally extends toward the rear wall 25 to direct the air flow channel(s) 35 upwardly out and away from the computer housing 20 and outwardly toward the rear of the computer housing 20.

Figure 9B:
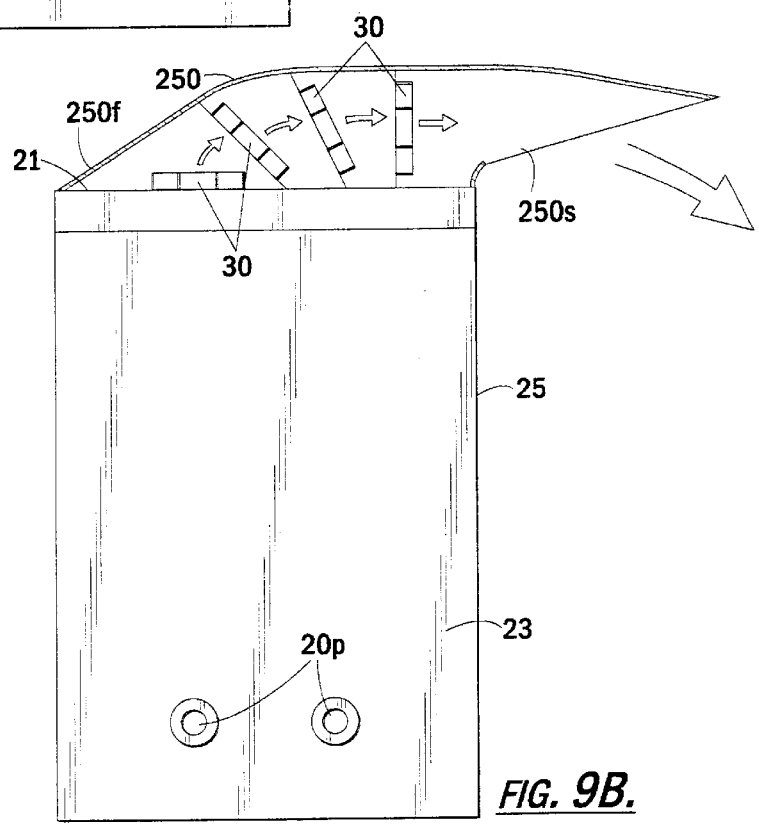
FIG. 9B is a partial cutaway of the computer and power exhaust stack shown in FIG. 9A, illustrating a plurality of fans mounted to at least partially extending (oriented at an angle above the horizontal axis) across the air flow channel at spaced apart intervals located along the length of the power exhaust stack according to one embodiment of the present invention.
Figure 10:
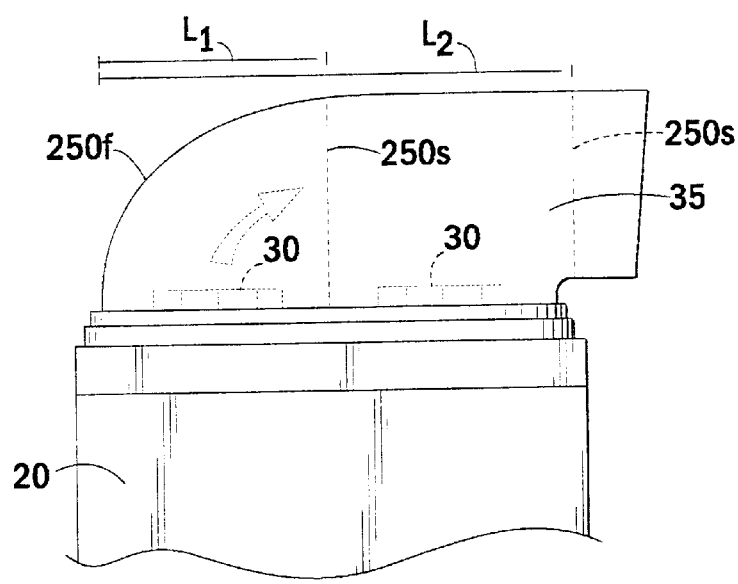
FIG. 10 is a partial side view of another embodiment of the present invention similar to that shown in FIG. 9A. As shown, the power exhaust stack can extend over the entire length of the computer casing (designated as $L_2$) or can be truncated short of the entire length (designated as $L_1$) and can include one or more exhaust fans horizontally mounted.

FIG. 9B is a partial cutaway view of the power stack configuration of FIG. 9A, illustrating a plurality of exhaust fans 30 (shown as four) mounted at different positions along the length of the air flow channel 35. In this embodiment, the fans 30 are mounted at an angle from the horizontal direction such that each extends across a portion of the air flow channel. Of course, as shown in FIG. 10, they can alternatively be mounted to extend horizontally across the top of the computer housing. The air foil section 250 can be formed as a matable two piece component (split lengthwise) which can allow for easier assembly of the fans across portions and along the length of the air flow channel not shown). The fans 30 shown in FIG. 9B can be mounted onto structural ribbing which can be attached to the internal walls of the air flow channel at the appropriate angles to orient the fan in the desired direction and at a desired position. The ribbing can be adhesively secured, brazed, welded, or attached by other means as is know to those of skill in the art. Preferably, the fans are mounted and spatially separated a sufficient distance to direct air out of the rear of the air flow channel. A plurality of equally rated fans can be used (preferably 10–30 cfm), or alternatively staggered and different rated fans can be employed. For example, a 30 cfm fan can be located either or both at the front and/or rear end of the air foil section with two lesser rated fans positioned intermediate thereof.

Figure 9C:
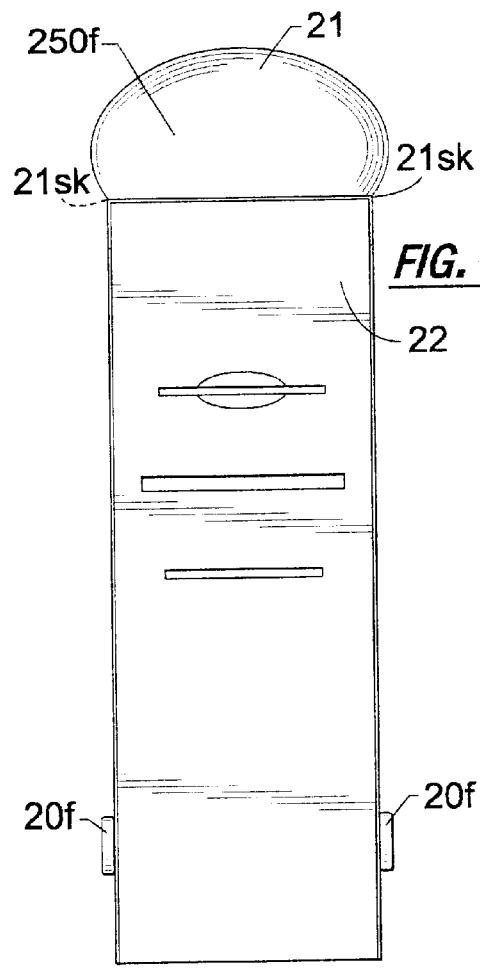
FIG. 9C is a front view of a power exhaust stack similar to that shown in FIG. 9A, illustrating that the airfoil configuration can be configured as a replacement ceiling, as an alternative to mounting onto a ceiling.

FIG. 9C illustrates that the power exhaust stack air foil section 250 can form the ceiling 21 of the housing itself. Indeed, in this embodiment, the air foil section sides 251 are configured to slidably attach to the mounts 21*sk* disposed on the upper portion of the skeletal frame (shown in FIG. 5A) to overlay or attach to the sidewalls and define the lower enclosure space for the computer components.

As shown in FIG. 10, the power exhaust stack 250 can end short of the entire length of the computer housing 20 (shown for example at length $L_1$ with a longer length $L_2$ represented in dotted line). Additionally, as shown in FIG. 10, a plurality of power exhaust fans 30 can be positioned along the length of the air flow channel 35. The exhaust fans 30 can each vent into a single air flow channel 35 (as shown) or can alternatively vent into an individually formed air channel within the power exhaust stack (not shown).

FIGS. 11A–11E illustrate yet another embodiment of a power exhaust stack 350 according to the present invention. In this embodiment, the power exhaust stack 350 is configured to resemble one or a bundle of cylindrical tubes resembling an exhaust manifold or exhaust pipe arrangement (such as are found on motorcycles). As shown in FIGS. 11A–11D, the power exhaust stack 350 includes at least one tubular member in fluid communication with at least one power exhaust fan 30. The power exhaust stack 350 (and preferably the exhaust fan 30) is mounted on an upper portion of at least one side wall 23, 24 proximate the ceiling 21. The computer housing 20 may include one power exhaust fan 30 and stack 350 arranged on one of the side walls 23. The computer housing 20 may alternatively include symmetrically positioned power exhaust stacks 350, with one tube 351, 352 (or one tube bundle 353) located on each opposing side wall 23, 24 as shown. Preferably, one or both of which may include a power exhaust fan 30 in fluid communication therewith. (In operation, one of the power stacks may merely act as an aesthetic balance element, they may be arranged in a master-slave set-up, or they may operate selectively or individually).

Figure 11D:
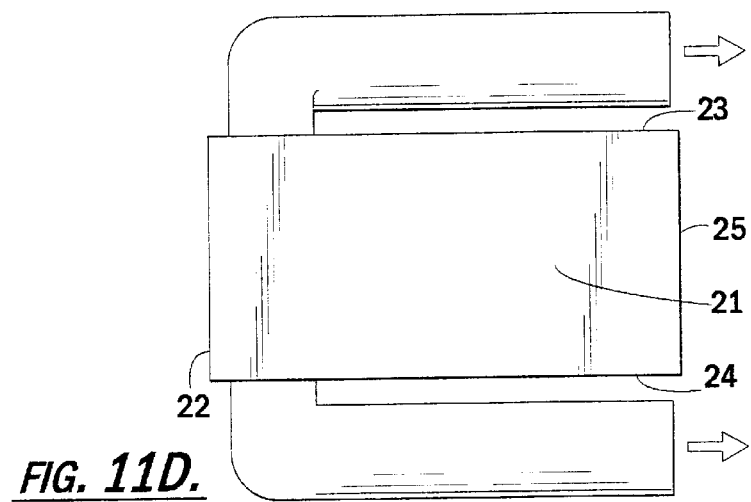
FIG. 11D is a top view of the design shown in FIG. 11A.
Figure 11E:
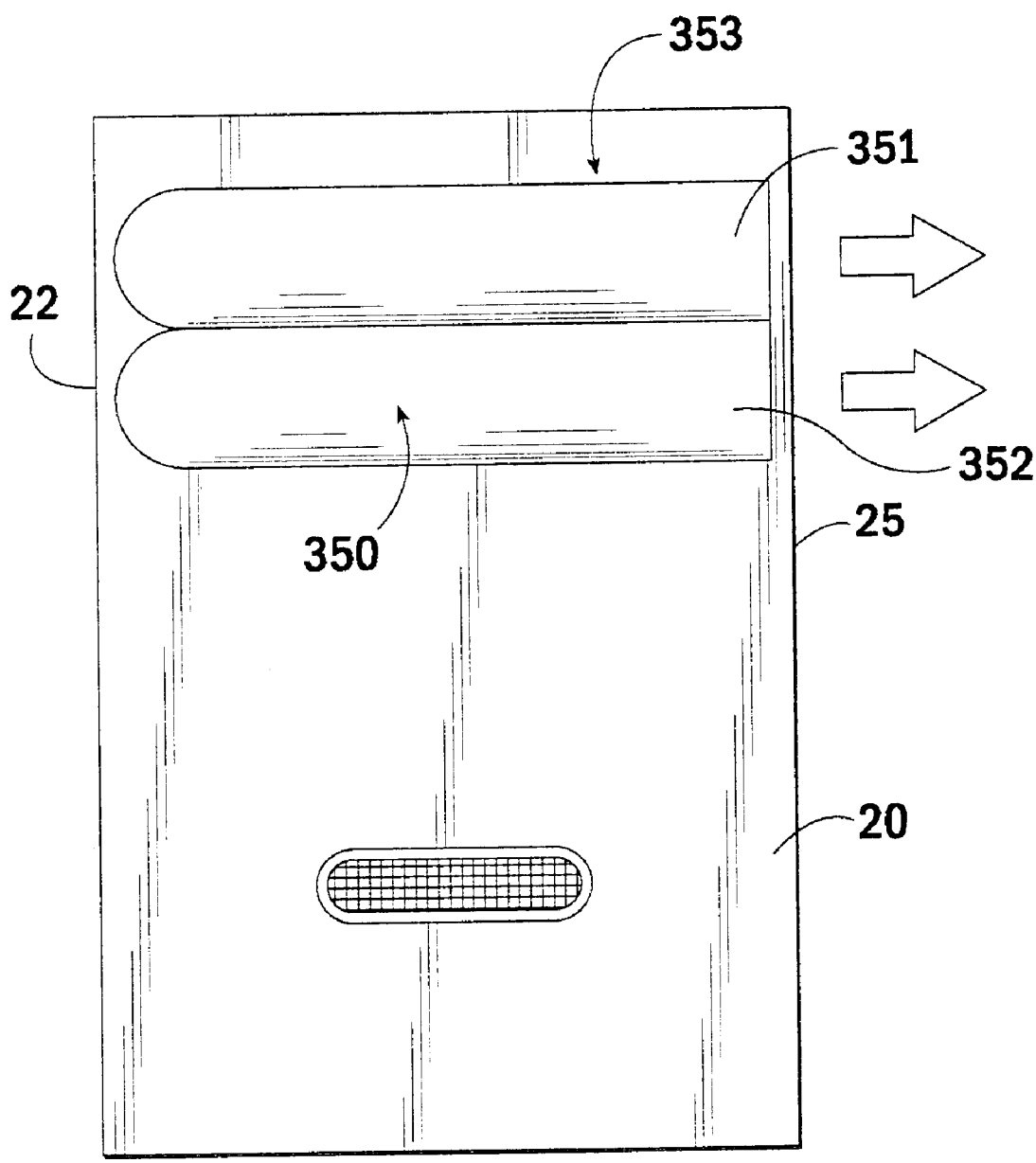
FIG. 11E is a side view of an alternate embodiment of a power exhaust stack similar to that shown in FIG. 11B illustrating the power exhaust stack as a plurality of tubes.

FIG. 11E illustrates two tubes positioned on the housing sidewall so as to be aligned to extend from approximately the same forward portion of the sidewall. Of course, the tubes can be alternatively arranged so as one is more forward, or each are spatially separated to extend from different regions of the housing sidewalls (although preferably from the top to help exhaust the hot air therefrom). Exhaust fan arrangements for power exhaust stacks 350 with tube bundles 353, can be such that a selected number (one, two, or all of the tubes) can be mounted in the computer so that they are in fluid communication with one exhaust fan 30 or each tube can operate with an (typically smaller rated) individual exhaust fan. Thus, one or more of the tubes 351, 352 may be non-functional as exhaust channels or may be operative from a shared exhaust fan arrangement or an individual exhaust fan arrangement.

As shown in FIG. 11D, looking from the top view, the profile of the tubular section(s) extends outwardly from a forward portion of the respective side wall 23, 24 and turns to extend generally horizontally along the length of the computer housing 20 to direct the air flow channel 35 along the length of the computer housing 20 to exit toward the rear wall 25.

For "header" arrangements, as is common with automotive "headers", each of the pipes can be configured with the same length along the length of the housing even though each subsequent pipe has a shorter horizontal length with respect to the mounting on the housing (not shown). That is, the header configuration can include a first pipe having a first substantially horizontally extending configuration and a first length extending from the front portion of the housing. A second pipe can be set back a distance along the length of the sidewall of the housing body and can have a second configuration (different from the first) with an additional amount of vertical length and a shorter horizontal length (defining the same overall length as the first length) each of the pipes then terminating at a common exhaust point, junction or body.

EXAMPLE

Figure 12:
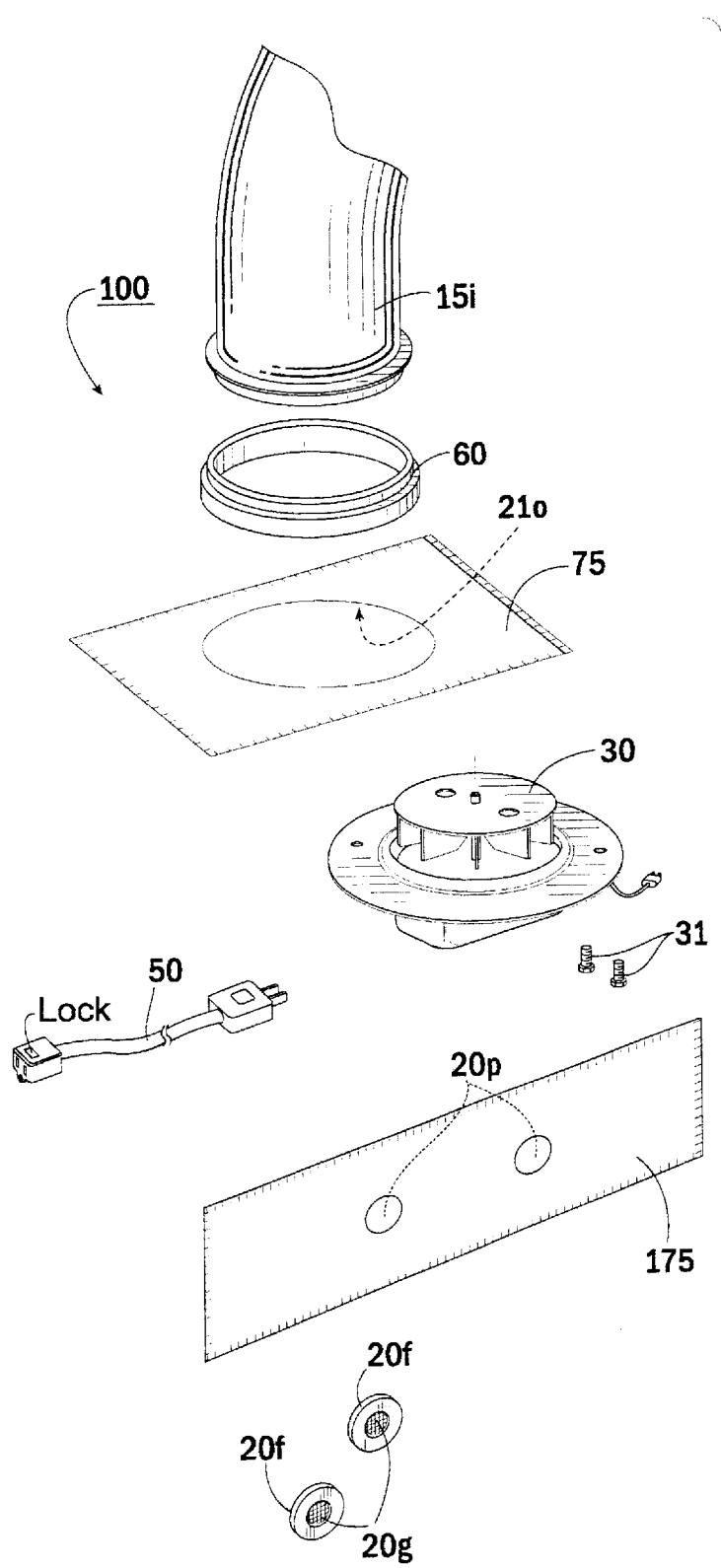
FIG. 12 illustrates a modification kit which can be used to install a power exhaust system on computers on an after-market basis.

FIG. 12 illustrates an example of power exhaust stack 15 modification hardware which was used to modify a personal computer as well as templates which can make the modification easier for subsequent users (i.e., a modification kit). As shown, an exhaust fan 30 was mounted to the skeleton frame 20*sk*. A suitable exhaust fan is manufactured by Droan Manufacturing Co. and is rated at 70 cfm. The exhaust fan 30 was positioned on top of the skeleton frame 20*sk* because of internal clearance issues and then threaded with screws 31 to attach same thereto (see also FIG. 4). A 4.5 inch opening 21*o* was formed in the ceiling 21 corresponding to the diameter size of the power exhaust stack 15 (which has the air flow channel 35 which fits over the exhaust fan 30). A sealing means 60 such as an O.D. axle installed seal wheel seal grit guard was used to assemble the exhaust stack 15 onto the ceiling over the exhaust fan 30. A suitable wheel seal is a Guardian HP axle installed seal manufactured by Stemco of Longview, Tex.

FIG. 4 illustrates the assembled configuration with the exhaust stack 15 press fit against the wheel seal 60 which is attached to the ceiling 21 (via an outdoor or durable adhesive such as OUTDOOR GOOP™). Of course, other attachment means and components can also be employed as will be appreciated by those of skill in the art. Preferably, the juncture of the exhaust stack 15 at the ceiling or housing portion is such that a substantially air tight seal is formed so that exhaust air is more efficiently forced out of the stack. and an outdoor adhesive used to join same. Two one-inch openings 20*p* were formed in each of the opposing side walls 23, 24 and grommets 20*g* were positioned in same to protect potentially exposed rough edges thereat. A lockable extension cord 50 (FIGS. 5B and 12) was routed in the housing 20 to connect the power hook up to the exhaust fan. The lockable power cord 50 allows the power to be locked on or off.

FIG. 12 illustrates a computer modification kit 100 that can allow users to modify existing computers. As shown, the kit 100 includes at least one template 75 with visual indicia (such as center markings, edge markings, aperture openings, marked units) representing at least one exhaust opening size (multiple templates or templates with multiple sized opening choices can also be provided). The template 75 can be overlaid onto the ceiling 21 (or for side-mounted stacks, side wall openings) and the proper opening corresponding to the selected exhaust stack formed into the computer. The kit 100 can also include the power exhaust stack 15, the sealing or mounting means 60, a plurality of grommet/filter assemblies 20g/20f, a power cord 50, and an exhaust fan 30. The kit can additionally include a second template 175 corresponding to air inlet port openings much like the template discussed above.

The computer housing with power exhaust stack of the present invention can also be customized to bear ornamental features or company logos according to a user's needs. For example, surface ornamentation, as well as "hood" ornaments or symbols can be applied to one or more of the stack itself or the housing.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A computer housing with a power exhaust stack, comprising:
    a computer housing with at least one upstanding wall and a ceiling attached to and overlying said at least one upstanding wall to define an enclosure space;
    at least one power exhaust stack extending upwardly from said housing ceiling, said power exhaust stack comprising a tubular section with an air flow channel formed therein, wherein said power exhaust stack tubular section has a profile when viewed from the side which rises a distance up from said ceiling and arcuately turns to direct said air flow channel above and away from said enclosure toward the rear of said computer housing and terminates proximate to the rear of the computer housing in a space above the ceiling;
    a plurality of air vents disposed in at least one of said at least one upstanding wall; and
    an exhaust fan mounted proximate to said ceiling in fluid communication with said power exhaust stack first end portion, wherein, during operation of a computer residing within said computer housing, said exhaust fan directs air out from said computer housing through said power exhaust stack.

2. A computer housing according to claim 1, wherein said power exhaust stack has a reflective external surface.

3. A computer housing according to claim 2, wherein said power exhaust stack external surface has the appearance of chrome.

4. A computer housing according to claim 3, wherein said computer housing is red.

5. A computer housing according to claim 1, wherein said at least one wall is four upstanding walls which includes a front wall, a rear wall, and two opposing side walls, and wherein said plurality of air vents comprises two air vents on a first side wall and two air vents on an opposing second side wall.

6. A computer housing according to claim 5, further comprising a plurality of air filters, at least one of said air filters being in fluid communication with each of said plurality of air vents.

7. A computer housing according to claim 5, further comprising a lid pivotably connected to the end of said power exhaust stack second portion.

8. A computer housing according to claim 1, further comprising an exhaust filter in fluid communication with said air flow channel of said power exhaust stack to inhibit the introduction of foreign objects therein.

9. A computer housing according to claim 1, wherein said ceiling has a length and a width, said length direction extending between the front and rear walls of said computer housing, and wherein said power exhaust stack tubular section is a single cylindrical shaped exhaust stack with a round cross-section which has a diameter sized at about at least 25–30% the length of said ceiling.

10. A computer housing according to claim 1, wherein said at least one power exhaust stack comprises a plurality of aligned power exhaust stacks, each of which has a tubular section of round cross-section with a diameter of about at least 4 inches.

11. A computer housing according to claim 1, wherein said ceiling has a length and a width, said length direction extending between the front and rear walls of said computer housing, and wherein said power exhaust stack tubular section has a substantially round cross-section with a diameter which is substantially equal to the width of said ceiling.

12. A computer housing according to claim 1, wherein said exhaust fan is rated to exhaust about 50–70 cubic feet per minute.

13. A computer housing according to claim 1, wherein said at least one wall comprises four upstanding walls which includes a front wall, a rear wall, and two opposing side walls, and wherein said at least one power exhaust stack tubular section is mounted on said ceiling adjacent said rear wall of said computer housing.

14. A computer housing according to claim 1, wherein said power exhaust stack is sized and configured to reside substantially within the space above the perimeter bounds of the ceiling of the computer housing to thereby direct exhaust air out and into the environment.

15. A computer housing according to claim 1, wherein said power exhaust stack is rigid.

16. A power exhaust modification kit for a computer, the computer having a top and opposing front and rear portions and side portions defining an enclosure therein, said kit comprising:
    an upwardly extending power exhaust stack comprising a tubular section having an air flow channel therein and opposing first and second end portions, wherein said power exhaust stack has a profile when viewed from the side such that it vertically rises a distance up from said tubular first end portion and then arcuately turns such that said tubular second end portion resides above and laterally away from said first end portion;
    a template configured to overlay at least a portion of the top of a computer, said template having visual indicia representing an opening sized and configured to correspond with said power exhaust stack first end portion for allowing a user to identify a desired location for an opening in the top of the computer; and
    an exhaust fan sized and configured to assemble to the computer proximate to the desired opening location, wherein, in position, said exhaust fan is operably associated with said power exhaust stack air channel to direct air above and away from the computer during operation.

17. A kit according to claim 16, further comprising a second template configured to overlay at least a portion of one side of the computer, said second template having visual indicia representing at least one air vent inlet aperture included thereon for allowing a user to identify at least one of a desired location or size for at least one opening in the side of the computer.

18. A kit according to claim 17, further comprising at least one grommet having an intermediate opening extending therethrough, said grommet sized and configured to reside in the opening identified by said template.

19. A kit according to claim 18, further comprising at least one filter for each air vent inlet opening introduced into the computer, such that, in position, said filter is configured and sized to inhibit the migration of particulate matter into the computer.

20. A kit according to claim 19, wherein said filters are integrally formed with said grommets into a grommet and filter assembly, and wherein said grommet and filter assembly are configured to be removably attachable to the computer to provide externally accessible replaceable filter units.

21. A kit according to claim 17, wherein said visual indicia of said second template represents two air vent inlet apertures for allowing a user to identify the desired location for two openings in at least one side of the computer.

22. A kit according to claim 16, further comprising a sealing means for sealably attaching said power exhaust stack to the computer such that it is in fluid communication with said exhaust fan.

23. A kit according to claim 16, wherein said power exhaust stack tubular section has a substantially round cross-section with a diameter of at least about four inches.

24. A kit according to claim 23, wherein said power exhaust stack tubular section has a reflective external surface.

25. A kit according to claim 16, wherein said power exhaust stack external surface has the appearance of or is chrome.

26. A kit according to claim 25, wherein said power exhaust stack is rigid.

27. A kit according to claim 16, wherein said power exhaust stack is sized and configured, so that when assembled, it resides substantially within the space above the perimeter bounds of a ceiling of the computer to thereby direct exhaust air out and into the environment.

28. A computer housing with a visually dominant top-mounted exhaust stack, comprising:
   a computer housing with four upstanding walls and a ceiling overlying said four upstanding walls, having opposing forward and rearward surfaces; and
   at least one power exhaust stack extending upwardly from said housing ceiling, said power exhaust stack comprising a tubular section with an air flow channel therein, said power exhaust tubular section having opposing first and second end portions, wherein said power exhaust stack has a profile when viewed from the side which rises generally vertically a distance up from said ceiling and then arcuately turns to direct said air flow channel toward the rear of said computer housing, and wherein said power exhaust stack second end portion is sized and configured to reside a distance above the ceiling of the housing and terminate proximate to the bounds of the rearward surface of the housing.

29. A computer housing according to claim 28, wherein said power exhaust stack has a reflective external surface.

30. A computer housing according to claim 28, wherein said power exhaust stack external surface has the appearance of or is chrome.

31. A computer housing according to claim 28, wherein said computer housing is red.

32. A computer housing according to claim 28, wherein said computer housing includes a plurality of aligned power exhaust stacks, each of which has a tubular section of substantially round cross-section having a diameter of about at least 4 inches.

33. A computer housing according to claim 28, wherein said ceiling has a length and a width, said length direction extending between the front and rear walls of said computer housing, and wherein said power exhaust stack tubular section is a single exhaust stack of substantially round cross-section which has a diameter sized at about at least 25–30% the length of said ceiling.

34. A computer housing according to claim 28, wherein said ceiling has a length and a width, said length direction extending between the front and rear walls of said computer housing, and wherein said power exhaust stack tubular section comprises a substantially round cross-section with a diameter which is substantially equal to the width of said ceiling.

35. A computer housing according to claim 28, wherein said power exhaust stack tubular section has a substantially round cross-section with a diameter of at least about four inches.

36. A computer housing according to claim 28, wherein said at least one power exhaust stack tubular section is configured and sized to have a length that positions the power exhaust stack within the space above the perimeter bounds of said ceiling.

37. A computer housing according to claim 28, wherein said power exhaust stack is rigid.

* * * * *